W. W. DUDLEY.
BALANCE COCK.
APPLICATION FILED APR. 19, 1911.

1,037,741.

Patented Sept. 3, 1912.

WITNESSES
Russell H. Dudley
A. T. Hayes

INVENTOR
William W. Dudley
by Chas. Williamson
Attorney

UNITED STATES PATENT OFFICE.

WILLIAM W. DUDLEY, OF LANCASTER, PENNSYLVANIA, ASSIGNOR TO HAMILTON WATCH COMPANY, OF LANCASTER, PENNSYLVANIA.

BALANCE-COCK.

1,037,741.   Specification of Letters Patent.   Patented Sept. 3, 1912.

Application filed April 19, 1911. Serial No. 622,071.

*To all whom it may concern:*

Be it known that I, WILLIAM W. DUDLEY, of Lancaster, in the county of Lancaster, and in the State of Pennsylvania, have invented a certain new and useful Improvement in Balance-Cocks, and do hereby declare that the following is a full, clear, and exact description thereof.

My invention relates to the attachment of the outer ends of hair springs or balance springs of watches and other time pieces, and the object of my invention is to provide a construction which without any impairment of the efficiency thereof will be simpler and cheaper to manufacture and possess other advantages over what has been done before.

Figure 1:
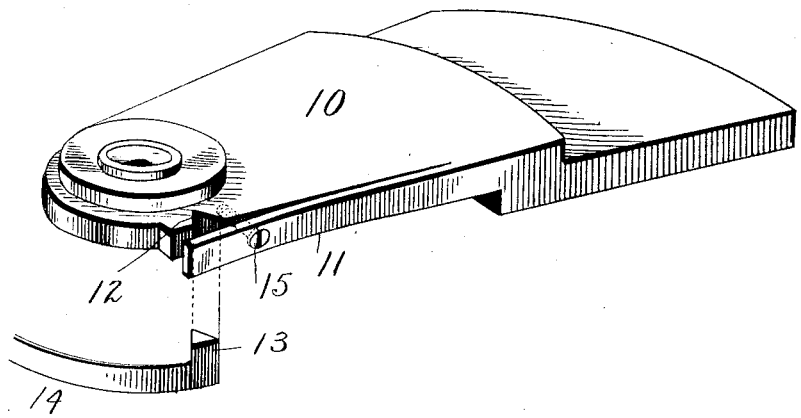
Figure 2:
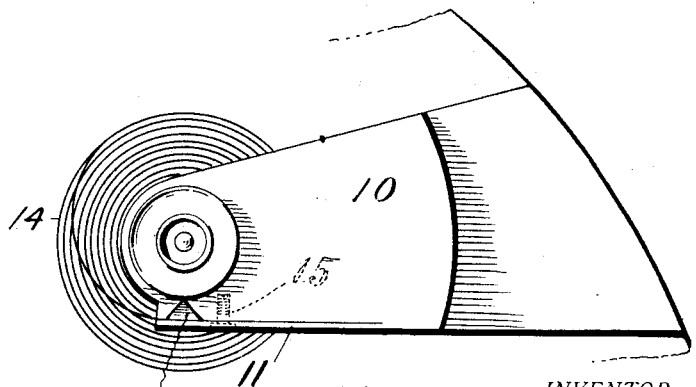

Referring to the accompanying drawings—Figure 1 is a detail view in perspective of the balance cock and a part of the hair spring separated; and Fig. 2 is a top plan view of enough of the same assembled.

It has heretofore been proposed to attach the outer end of the hair or balance spring to the balance cock by clamping a stud on the spring between the side of the balance cock and a slender spring finger made separate from the balance cock and secured thereto near each end by screws, one of the screws being contiguous to the point where the spring stud is engaged by said finger and holding that end of the spring finger against the stud and against the side of the balance cock in opposition to its normal tendency to spring away therefrom, so that when said screw is removed the stud engaging end of the spring finger will, by reason of its resilient nature move away from the side of the balance cock and thus release the stud. There are certain practical objections to this construction, among them being the expensiveness, or cost of manufacture of the separate spring and the cost of assembling it, and the presence of the spring as a separate part screwed to the side of the balance cock detracts somewhat from its appearance.

By my invention I overcome the objections noted, and as will be seen by reference to the embodiment of my invention illustrated in the drawings, I take a balance cock 10 that is otherwise of ordinary construction, both as to design and material, and by a very fine saw slit it parallel with one side from its end near the staff inward to form a thin tongue or finger 11, of preferably uniform thickness, which at its inner end, of course, remains integral with the balance cock, it being free or disconnected from that point outward toward the free or staff end of the balance cock. Either in the inner side of the finger 11, near the outer end thereof, or in the contiguous side of the balance cock, I cut the stud-receiving notch 12, which, as shown, may be of angular form, to conform to the corresponding shape of the stud 13 of the hair spring 14. At a point close to one side of the stud-receiving notch there are alining holes in the finger, and in the body of the balance cock, the latter being tapped or threaded so that a headed screw 15 passed through the hole in the finger and entering the threaded hole in the balance cock may draw the finger against the side of the balance cock and clamp the hair spring stud in the notch. The finger by means of the screw may be drawn so tight against the side of the balance cock that the joint between them where they are severed is practically invisible, and hence the appearance of the balance cock is in no wise impaired or marred. Besides the matter of improvement of appearance, but a single screw is required and the cost of manufacture and assemblage of the parts is less than in the case of the construction hereinabove described.

It is essential that normally the spring finger shall tend to move away from the side of the balance cock to unclamp or to release the hair spring stud. The metal of which the balance cock is made does not possess sufficient elasticity to secure this action, and I, therefore, give this characteristic or power to the finger by swaging it for a portion of its length beginning from its point of connection with the balance cock outward so as to harden it and convert it into a spring that normally tends to move away from the side of the balance cock and is restrained from such movement only by the use of the clamping screw 15.

Having thus described my invention what I claim is—

A balance cock for time keeping instrument having a clamping finger at the side of the balance cock integral with the balance cock at the inner end, and thence outward being separate from the balance cock and hardened contiguous to its point of connection with the balance cock and forming a spring that at the free end of the finger tends normally away from the balance cock, and a screw to draw the free end of said finger inward to perform its clamping function.

In testimony that I claim the foregoing I have hereunto set my hand.

WILLIAM W. DUDLEY.

Witnesses:
RUSSELL H. DUDLEY,
CHAS J. WILLIAMSON.

Copies of this patent may be obtained for five cents each, by addressing the "Commissioner of Patents, Washington, D. C."